(12) United States Patent
Studer et al.

(10) Patent No.: US 11,298,950 B2
(45) Date of Patent: Apr. 12, 2022

(54) PRINT LIQUID SUPPLY UNITS

(71) Applicant: Hewlett-Packard Development Company, L.P., Spring, TX (US)

(72) Inventors: Anthony Donald Studer, Albany, OR (US); David Olsen, Corvallis, OR (US); Quinton Buford Weaver, Albany, OR (US); Brian Allen Nichols, Albany, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 7 days.

(21) Appl. No.: 16/768,583

(22) PCT Filed: Jul. 18, 2019

(86) PCT No.: PCT/US2019/042465
§ 371 (c)(1),
(2) Date: May 29, 2020

(87) PCT Pub. No.: WO2020/117322
PCT Pub. Date: Jun. 11, 2020

(65) Prior Publication Data
US 2021/0252870 A1    Aug. 19, 2021

(30) Foreign Application Priority Data

Dec. 3, 2018   (WO) ................ PCT/US2018/063624
Dec. 3, 2018   (WO) ................ PCT/US2018/063630
(Continued)

(51) Int. Cl.
*B41J 2/175*   (2006.01)
*B41J 29/393*  (2006.01)
(Continued)

(52) U.S. Cl.
CPC ........... *B41J 2/17546* (2013.01); *B33Y 50/00* (2014.12); *B41J 2/1752* (2013.01); *B41J 2/1753* (2013.01);
(Continued)

(58) Field of Classification Search
CPC ...... B41J 2/175; B41J 2/17513; B41J 2/1752; B41J 2/17523; B41J 2/17526;
(Continued)

(56) References Cited

U.S. PATENT DOCUMENTS 4,074,284 A    2/1978  Dexter et al.
4,506,276 A    3/1985  Kyser et al.
(Continued)

FOREIGN PATENT DOCUMENTS

AU    2014202104 A1    5/2014
CA      2507422 A1     1/2002
(Continued)

OTHER PUBLICATIONS

Epson, "Epson provides the best inks for the job," retrieved from https://www.epson.co.nz/microsite/excellence/inks_why.asp, ast retrieved on Jul. 1, 2019, 3 pages.
(Continued)

*Primary Examiner* — Anh T Vo
(74) *Attorney, Agent, or Firm* — Austin Rapp

(57) ABSTRACT

Examples of a print liquid supply unit are described herein. In some examples, the print liquid supply unit includes a first housing component that is welded to a second housing component along a supply joint. In some examples, the print liquid supply unit also includes a conductor situated through the supply joint from an outside of the supply unit to an inside of the supply unit. In some examples, the conductor is sealed in the supply joint with a sealing material.

21 Claims, 10 Drawing Sheets

(30) Foreign Application Priority Data

Dec. 3, 2018 (WO) .............. PCT/US2018/063631
Dec. 3, 2018 (WO) .............. PCT/US2018/063638
Dec. 3, 2018 (WO) .............. PCT/US2018/063643
Apr. 5, 2019 (WO) .............. PCT/US2019/026145

(51) Int. Cl.

| | |
|---|---|
| G01L 23/08 | (2006.01) |
| G06F 13/42 | (2006.01) |
| G06F 21/44 | (2013.01) |
| G06K 15/00 | (2006.01) |
| B33Y 50/00 | (2015.01) |
| G03G 15/08 | (2006.01) |
| G06K 15/10 | (2006.01) |

(52) U.S. Cl.
CPC ....... *B41J 2/17513* (2013.01); *B41J 2/17523* (2013.01); *B41J 2/17526* (2013.01); *B41J 2/17566* (2013.01); *B41J 29/393* (2013.01); *G01L 23/08* (2013.01); *G03G 15/0856* (2013.01); *G06F 13/42* (2013.01); *G06F 13/4282* (2013.01); *G06F 21/44* (2013.01); *G06K 15/102* (2013.01); *G06K 15/4075* (2013.01); *G05B 2219/49023* (2013.01); *G06F 2213/0016* (2013.01); *G06F 2213/40* (2013.01)

(58) Field of Classification Search
CPC .............. B41J 2/17546; B41J 2/17553; B41J 2/17566; B41J 29/02; B41J 29/393; G06F 13/42; G06F 13/4282; G06F 21/44; G03G 15/0856; G06K 15/102; G06K 15/4075
See application file for complete search history.

(56) References Cited

U.S. PATENT DOCUMENTS

| | | | |
|---|---|---|---|
| 4,639,738 | A | 1/1987 | Young et al. |
| 4,734,787 | A | 3/1988 | Hayashi |
| 5,001,596 | A | 3/1991 | Hart |
| 5,045,811 | A | 9/1991 | Lewis |
| 5,079,570 | A | 1/1992 | Mohr et al. |
| 5,142,909 | A | 9/1992 | Baughman |
| 5,329,254 | A | 7/1994 | Takano |
| 5,438,351 | A | 8/1995 | Trenchard et al. |
| 5,471,176 | A | 11/1995 | James et al. |
| 5,583,544 | A | 12/1996 | Stamer et al. |
| 5,680,960 | A | 10/1997 | Keyes et al. |
| 5,682,184 | A | 10/1997 | Stephany et al. |
| 5,699,091 | A | 12/1997 | Bullock |
| 5,731,824 | A | 3/1998 | Kneezel et al. |
| 5,751,323 | A | 5/1998 | Swanson |
| 5,757,406 | A | 5/1998 | Kaplinsky |
| 5,777,646 | A | 7/1998 | Barinaga |
| 5,788,388 | A | 8/1998 | Cowger et al. |
| 5,861,780 | A | 1/1999 | Fukuda |
| 5,975,688 | A | 11/1999 | Kanaya et al. |
| 6,068,363 | A | 5/2000 | Saito |
| 6,098,457 | A | 8/2000 | Poole |
| 6,151,039 | A | 11/2000 | Hmelar et al. |
| 6,164,766 | A | 12/2000 | Erickson |
| 6,175,929 | B1 | 1/2001 | Hsu et al. |
| 6,219,933 | B1 | 4/2001 | Taniguchi |
| 6,299,273 | B1 | 10/2001 | Anderson |
| 6,312,074 | B1 | 11/2001 | Walker |
| 6,341,853 | B1 | 1/2002 | Scheffelin et al. |
| 6,386,693 | B1 | 5/2002 | Michele |
| 6,402,299 | B1 | 6/2002 | DeMeerleer |
| 6,412,901 | B2 | 7/2002 | Su et al. |
| 6,431,670 | B1 | 8/2002 | Schantz et al. |
| 6,456,802 | B1 | 9/2002 | Phillips |
| 6,457,355 | B1 | 10/2002 | Philipp |
| 6,494,553 | B1 | 12/2002 | Donahue et al. |
| 6,494,568 | B2 | 12/2002 | Hou et al. |
| 6,598,963 | B1 | 7/2003 | Yamamoto et al. |
| 6,641,240 | B2 | 11/2003 | Hsu et al. |
| 6,641,243 | B2 | 11/2003 | Anderson et al. |
| 6,648,434 | B2 | 11/2003 | Walker et al. |
| 6,685,290 | B1 | 2/2004 | Farr et al. |
| 6,736,497 | B2 | 5/2004 | Jung |
| 6,796,644 | B1 | 9/2004 | Anderson, Jr. et al. |
| 6,802,581 | B2 | 10/2004 | Hasseler et al. |
| 6,802,602 | B2 | 10/2004 | Sakai et al. |
| 6,811,250 | B2 | 11/2004 | Buchanan et al. |
| 6,902,256 | B2 | 6/2005 | Anderson et al. |
| 6,908,179 | B2 | 6/2005 | Pan et al. |
| 6,959,599 | B2 | 11/2005 | Feldstein et al. |
| 6,966,222 | B2 | 11/2005 | Carson et al. |
| 6,969,137 | B2 | 11/2005 | Maeda |
| 7,039,734 | B2 | 5/2006 | Sun et al. |
| 7,077,506 | B2 | 7/2006 | Chen |
| 7,171,323 | B2 | 1/2007 | Shipton et al. |
| 7,240,130 | B2 | 7/2007 | Larson |
| 7,260,662 | B2 | 8/2007 | Moriwaki et al. |
| 7,328,115 | B2 | 2/2008 | Shipton et al. |
| 7,380,042 | B2 | 5/2008 | Wang et al. |
| 7,458,656 | B2 | 12/2008 | Smith |
| 7,533,960 | B2 | 5/2009 | Yasuda et al. |
| 7,547,082 | B2 | 6/2009 | Lee et al. |
| 7,630,304 | B2 | 12/2009 | Larson et al. |
| 7,686,423 | B2 | 3/2010 | Sato et al. |
| 7,740,347 | B2 | 6/2010 | Silverbrook et al. |
| 7,775,638 | B2 | 8/2010 | Hirosawa et al. |
| 7,841,712 | B2 | 11/2010 | Muyskens et al. |
| 7,886,197 | B2 | 2/2011 | Wegman |
| 7,890,690 | B2 | 2/2011 | Naderi et al. |
| 7,970,042 | B2 | 6/2011 | Lexmark |
| 8,040,215 | B2 | 10/2011 | Zakriti |
| 8,161,224 | B2 | 4/2012 | Laurencin et al. |
| 8,215,018 | B2 | 7/2012 | Morita et al. |
| 8,220,910 | B2 | 7/2012 | Wanibe |
| 8,224,602 | B2 | 7/2012 | Lory et al. |
| 8,289,788 | B2 | 10/2012 | Asauchi |
| 8,331,581 | B2 | 12/2012 | Pennock |
| 8,348,377 | B2 | 1/2013 | Asauchi |
| 8,350,628 | B1 | 1/2013 | George et al. |
| 8,364,859 | B2 | 1/2013 | Sato |
| 8,386,657 | B2 | 2/2013 | Adkins et al. |
| 8,393,718 | B2 | 3/2013 | Kida et al. |
| 8,393,721 | B2 | 3/2013 | Katoh et al. |
| 8,429,437 | B2 | 4/2013 | Asauchi |
| 8,432,421 | B2 | 4/2013 | Muraki et al. |
| 8,438,919 | B2 | 5/2013 | Phillips et al. |
| 8,454,137 | B2 | 6/2013 | Price et al. |
| 8,556,394 | B2 | 10/2013 | Chen |
| 8,558,577 | B1 | 10/2013 | Soriano Fosas et al. |
| 8,562,091 | B2 | 10/2013 | Sabanovic et al. |
| 8,591,012 | B2 | 11/2013 | Yoshino et al. |
| 8,608,276 | B2 | 12/2013 | Oohashi et al. |
| 8,621,116 | B2 | 12/2013 | Fister et al. |
| 8,651,614 | B2 | 2/2014 | Sakamoto |
| 8,651,643 | B2 | 2/2014 | Harvey |
| 8,721,059 | B2 | 5/2014 | Kodama et al. |
| 8,721,203 | B2 | 5/2014 | Ehrhardt, Jr. |
| 8,752,943 | B2 | 6/2014 | Hirano |
| 8,864,277 | B2 | 10/2014 | Rice et al. |
| 8,876,257 | B2 | 11/2014 | Harada et al. |
| 8,888,207 | B2 | 11/2014 | Furness, III |
| 8,892,798 | B2 | 11/2014 | Tailliet et al. |
| 8,898,358 | B2 | 11/2014 | DeCesaris et al. |
| 8,978,487 | B2 | 3/2015 | Fergusson et al. |
| 8,990,467 | B2 | 3/2015 | Saito |
| 9,079,414 | B2 | 7/2015 | Lester et al. |
| 9,108,448 | B1 | 8/2015 | Bergstedt |
| 9,132,656 | B2 | 9/2015 | Nicholson, III et al. |
| 9,137,093 | B1 | 9/2015 | Abraham |
| 9,176,921 | B2 | 11/2015 | Fister et al. |
| 9,194,734 | B2 | 11/2015 | Mehrer |
| 9,213,396 | B1 | 12/2015 | Booth et al. |
| 9,213,927 | B1 | 12/2015 | Ahne et al. |
| 9,254,661 | B2 | 2/2016 | Otaka et al. |
| 9,298,908 | B1 | 3/2016 | Booth et al. |

(56) References Cited

U.S. PATENT DOCUMENTS

| | | |
|---|---|---|
| 9,370,934 B2 | 6/2016 | Asauchi et al. |
| 9,400,204 B2 | 7/2016 | Schoenberg |
| 9,413,356 B1 | 8/2016 | McKinley |
| 9,413,359 B2 | 8/2016 | Stirk |
| 9,454,504 B2 | 9/2016 | Evans |
| 9,483,003 B2 | 11/2016 | Thacker, III |
| 9,487,017 B2 | 11/2016 | Ge et al. |
| 9,496,884 B1 | 11/2016 | Azenkot et al. |
| 9,511,596 B2 | 12/2016 | Anderson et al. |
| 9,561,662 B2 | 2/2017 | Ward et al. |
| 9,582,443 B1 | 2/2017 | Switzer et al. |
| 9,599,500 B2 | 3/2017 | Ge et al. |
| 9,619,663 B2 | 4/2017 | Refstrup |
| 9,671,820 B2 | 6/2017 | Maruyama et al. |
| 9,734,121 B2 | 8/2017 | Pitigoi-Aron et al. |
| 9,738,087 B2 | 8/2017 | Kato |
| 9,746,799 B2 | 8/2017 | Jeran |
| 9,770,914 B2 | 9/2017 | Harvey et al. |
| 9,776,412 B2 | 10/2017 | Ge et al. |
| 9,789,697 B1 | 10/2017 | Knierim et al. |
| 9,796,178 B2 | 10/2017 | Maxfield |
| 9,852,282 B2 | 12/2017 | Jeran et al. |
| 9,876,794 B2 | 1/2018 | Adkins et al. |
| 9,895,917 B2 | 2/2018 | Corvese et al. |
| 9,914,306 B2 | 3/2018 | Jeran |
| 9,922,276 B2 | 3/2018 | Fister et al. |
| 9,994,036 B2 | 6/2018 | Angulo Navarro et al. |
| 10,031,882 B2 | 7/2018 | Srivastava et al. |
| 10,052,878 B2 | 8/2018 | Benneton |
| 10,107,667 B2 | 10/2018 | Cumbie et al. |
| 10,146,608 B2 | 12/2018 | Giovannini et al. |
| 10,155,379 B2 | 12/2018 | Ng et al. |
| 10,214,018 B2 | 2/2019 | Nozawa et al. |
| 10,214,019 B2 | 2/2019 | Campbell-Brown et al. |
| 10,259,230 B2 | 4/2019 | Asauchi |
| 10,279,594 B2 | 5/2019 | Horade |
| 10,338,838 B2 | 7/2019 | Olarig |
| 10,471,725 B2 | 11/2019 | Esterberg |
| 10,875,318 B1 | 12/2020 | Gardner |
| 10,894,423 B2 | 1/2021 | Gardner |
| 11,034,157 B2 | 6/2021 | Gardner |
| 2001/0029554 A1 | 10/2001 | Namba |
| 2001/0033316 A1 | 10/2001 | Eida |
| 2002/0012016 A1 | 1/2002 | Wilson |
| 2002/0012616 A1 | 1/2002 | Zhou et al. |
| 2002/0033855 A1 | 3/2002 | Kubota et al. |
| 2002/0109761 A1 | 8/2002 | Shimizu et al. |
| 2002/0129650 A1 | 9/2002 | Zimmermann |
| 2002/0154181 A1 | 10/2002 | Kubota et al. |
| 2003/0009595 A1 | 1/2003 | Collins |
| 2003/0018300 A1 | 1/2003 | Duchon et al. |
| 2003/0071862 A1 | 4/2003 | Tsukada et al. |
| 2003/0202024 A1 | 10/2003 | Corrigan |
| 2004/0021711 A1 | 2/2004 | Hasseler |
| 2004/0036733 A1 | 2/2004 | Kubota et al. |
| 2004/0085382 A1 | 5/2004 | Kosugi et al. |
| 2004/0155913 A1 | 8/2004 | Kosugi et al. |
| 2004/0252146 A1 | 12/2004 | Naka |
| 2005/0010910 A1 | 1/2005 | Lindhorst et al. |
| 2005/0093910 A1 | 5/2005 | Im |
| 2005/0125105 A1 | 6/2005 | Halstead |
| 2005/0126282 A1 | 6/2005 | Maatuk |
| 2005/0185595 A1 | 8/2005 | Lee |
| 2005/0229699 A1 | 10/2005 | Chai et al. |
| 2006/0007253 A1 | 1/2006 | Kosugi |
| 2006/0007295 A1 | 1/2006 | Ueda |
| 2006/0072952 A1 | 4/2006 | Plunkett et al. |
| 2006/0110199 A1 | 5/2006 | Walmsley et al. |
| 2006/0181583 A1 | 8/2006 | Usuda |
| 2006/0181719 A1 | 8/2006 | Aoki et al. |
| 2006/0221386 A1 | 10/2006 | Brooks et al. |
| 2006/0244795 A1 | 11/2006 | Hayasaki et al. |
| 2006/0268030 A1 | 11/2006 | Walmsley et al. |
| 2006/0274103 A1 | 12/2006 | Kim |
| 2006/0290723 A1 | 12/2006 | Jeong et al. |
| 2007/0024650 A1 | 2/2007 | Reinter et al. |
| 2007/0068249 A1 | 3/2007 | Eguchi |
| 2007/0088816 A1 | 4/2007 | Hrustemovic et al. |
| 2007/0115307 A1 | 5/2007 | Smith |
| 2007/0146409 A1 | 6/2007 | Kubota et al. |
| 2007/0247497 A1 | 10/2007 | Buchanan |
| 2008/0024555 A1 | 1/2008 | Kimura |
| 2008/0041152 A1 | 2/2008 | Schoenberg |
| 2008/0107151 A1 | 5/2008 | Khadkikar et al. |
| 2008/0129779 A1 | 6/2008 | Walmsley et al. |
| 2008/0143476 A1 | 6/2008 | Cheung et al. |
| 2008/0165232 A1 | 7/2008 | Yuen |
| 2008/0192074 A1 | 8/2008 | Dubois |
| 2008/0211838 A1 | 9/2008 | Zhang |
| 2008/0246626 A1 | 10/2008 | Sheafor et al. |
| 2008/0298455 A1 | 12/2008 | Ilia et al. |
| 2008/0307134 A1 | 12/2008 | Geissler et al. |
| 2009/0013779 A1 | 1/2009 | Usui |
| 2009/0021766 A1 | 1/2009 | Yamazaki |
| 2009/0177823 A1 | 7/2009 | Chao |
| 2009/0179678 A1 | 7/2009 | Hardin |
| 2009/0290005 A1 | 11/2009 | Wanibe |
| 2009/0309941 A1 | 12/2009 | Price |
| 2010/0082271 A1 | 4/2010 | McCann et al. |
| 2010/0138745 A1 | 6/2010 | McNamara |
| 2010/0205350 A1 | 8/2010 | Bryant-Rich |
| 2010/0220128 A1 | 9/2010 | Zaba |
| 2010/0248208 A1 | 9/2010 | Okubo et al. |
| 2010/0254202 A1 | 10/2010 | Asauchi |
| 2010/0257327 A1 | 10/2010 | Kosugi |
| 2010/0306431 A1 | 12/2010 | Adkins et al. |
| 2011/0009938 A1 | 1/2011 | Dowling |
| 2011/0029705 A1 | 2/2011 | Evans |
| 2011/0050793 A1 | 3/2011 | Kumagai et al. |
| 2011/0087914 A1 | 4/2011 | Files et al. |
| 2011/0113171 A1 | 5/2011 | Radhakrishnan et al. |
| 2011/0131441 A1 | 6/2011 | Asauchi |
| 2011/0279530 A1 | 11/2011 | Love |
| 2011/0285027 A1 | 11/2011 | Lee |
| 2012/0128379 A1 | 5/2012 | Takeda |
| 2012/0243559 A1 | 9/2012 | Pan |
| 2012/0284429 A1 | 11/2012 | Adkins et al. |
| 2012/0299989 A1 | 11/2012 | Prothon |
| 2013/0018513 A1 | 1/2013 | Metselaar |
| 2013/0054933 A1 | 2/2013 | Fister et al. |
| 2013/0067015 A1 | 3/2013 | Vasters |
| 2013/0067016 A1 | 3/2013 | Adkins et al. |
| 2013/0155142 A1 | 6/2013 | Browning et al. |
| 2013/0250024 A1 | 9/2013 | Kakishima |
| 2013/0295245 A1 | 11/2013 | Gardner et al. |
| 2014/0040517 A1 | 2/2014 | Fister et al. |
| 2014/0095750 A1 | 4/2014 | Tailliet |
| 2014/0164660 A1 | 6/2014 | DeCesaris et al. |
| 2014/0211241 A1 | 7/2014 | Rice et al. |
| 2014/0260520 A1 | 9/2014 | Schoenberg |
| 2014/0265049 A1 | 9/2014 | Burris et al. |
| 2014/0337553 A1 | 11/2014 | Du et al. |
| 2014/0351469 A1 | 11/2014 | Fister et al. |
| 2014/0354729 A1 | 12/2014 | Vanbrocklin |
| 2014/0372652 A1 | 12/2014 | Shu |
| 2014/0375321 A1 | 12/2014 | Ikeya |
| 2014/0375730 A1 | 12/2014 | Campbell-Brown |
| 2015/0028671 A1 | 1/2015 | Ragaini |
| 2015/0052996 A1 | 2/2015 | Niemann |
| 2015/0074304 A1 | 3/2015 | Adkins et al. |
| 2015/0089630 A1 | 3/2015 | Lee |
| 2015/0239254 A1 | 8/2015 | Muyskens et al. |
| 2015/0285526 A1 | 10/2015 | Smith et al. |
| 2015/0343792 A1 | 12/2015 | Refstrup |
| 2016/0055402 A1 | 2/2016 | Fister et al. |
| 2016/0098359 A1 | 4/2016 | Adkins et al. |
| 2016/0110535 A1 | 4/2016 | Booth |
| 2016/0114590 A1 | 4/2016 | Arpin |
| 2016/0279962 A1 | 9/2016 | Ishida et al. |
| 2016/0357691 A1 | 12/2016 | Ahne |
| 2016/0364305 A1 | 12/2016 | Pitigou-Aron |
| 2016/0368273 A1 | 12/2016 | Ishikawa |
| 2017/0032135 A1 | 2/2017 | Refstrup |
| 2017/0050383 A1 | 2/2017 | Bell |

(56) References Cited

U.S. PATENT DOCUMENTS

| | | |
|---|---|---|
| 2017/0100941 A1 | 4/2017 | Kuribayashi |
| 2017/0144448 A1 | 5/2017 | Smith |
| 2017/0157929 A1 | 6/2017 | Yokoo |
| 2017/0168976 A1 | 6/2017 | Yost et al. |
| 2017/0169623 A1 | 6/2017 | Chen |
| 2017/0182786 A1 | 6/2017 | Angulo Navarro |
| 2017/0189011 A1 | 7/2017 | Stone et al. |
| 2017/0194913 A1 | 7/2017 | Wilson et al. |
| 2017/0230540 A1 | 8/2017 | Sasaki |
| 2017/0330449 A1 | 11/2017 | Lunardhi |
| 2018/0050537 A1 | 2/2018 | Bakker et al. |
| 2018/0100753 A1 | 4/2018 | Cumbie et al. |
| 2018/0143935 A1 | 5/2018 | Cox |
| 2018/0157943 A1 | 6/2018 | Fister et al. |
| 2018/0162137 A1 | 6/2018 | Van Brocklin et al. |
| 2018/0212593 A1 | 7/2018 | Usuda |
| 2018/0264808 A1 | 9/2018 | Bakker et al. |
| 2018/0281394 A1 | 10/2018 | Horade et al. |
| 2018/0281438 A1 | 10/2018 | Horade |
| 2018/0290457 A1 | 10/2018 | Ge |
| 2018/0302110 A1 | 10/2018 | Solan |
| 2018/0304640 A1 | 10/2018 | Horne |
| 2019/0004991 A1 | 1/2019 | Foust et al. |
| 2019/0011306 A1 | 1/2019 | Cumbie et al. |
| 2019/0012663 A1 | 1/2019 | Masters |
| 2019/0013731 A1 | 1/2019 | Gritti |
| 2019/0023020 A1 | 1/2019 | Anderson |
| 2019/0061347 A1 | 2/2019 | Bakker et al. |
| 2019/0064408 A1 | 2/2019 | Smit |
| 2019/0097785 A1 | 3/2019 | Elenes |
| 2019/0111694 A1 | 4/2019 | Cumbie et al. |
| 2019/0111695 A1 | 4/2019 | Anderson et al. |
| 2019/0111696 A1 | 4/2019 | Anderson et al. |
| 2019/0118527 A1 | 4/2019 | Anderson et al. |
| 2019/0126631 A1 | 5/2019 | Anderson et al. |
| 2019/0137316 A1 | 5/2019 | Anderson |
| 2019/0138484 A1 | 5/2019 | De Santiago Dominguez et al. |
| 2019/0217628 A1 | 7/2019 | Horade et al. |
| 2019/0226930 A1 | 7/2019 | Cumbie |
| 2019/0240985 A1 | 8/2019 | Ge |
| 2020/0159689 A1 | 5/2020 | Koshisaka |
| 2021/0334392 A1 | 10/2021 | Panshin |

FOREIGN PATENT DOCUMENTS

| | | |
|---|---|---|
| CN | 2603934 | 2/2004 |
| CN | 2734479 | 10/2005 |
| CN | 201761148 | 3/2011 |
| CN | 102231054 | 11/2011 |
| CN | 203651218 U | 6/2014 |
| CN | 102736627 | 12/2014 |
| CN | 103879149 B | 6/2015 |
| CN | 105760318 A | 7/2016 |
| CN | 107209743 A | 9/2017 |
| CN | 108819486 | 11/2018 |
| CN | 209014461 U | 6/2019 |
| DE | 3712699 C2 | 3/1989 |
| EP | 0015954 A1 | 6/1984 |
| EP | 0720916 A2 | 7/1996 |
| EP | 1285764 | 2/2003 |
| EP | 0994779 B1 | 4/2003 |
| EP | 1314565 A2 | 5/2003 |
| EP | 1238811 B1 | 12/2006 |
| EP | 1800872 | 6/2007 |
| EP | 1389531 | 7/2007 |
| EP | 1164022 B1 | 7/2008 |
| EP | 1524120 B1 | 9/2008 |
| EP | 2237163 | 10/2010 |
| EP | 1839872 B1 | 11/2010 |
| EP | 2385468 | 11/2011 |
| EP | 2854063 | 6/2019 |
| EP | 3208736 | 12/2019 |
| GB | 2519181 | 4/2015 |
| JP | H04220353 | 8/1992 |
| JP | 2001292133 | 10/2001 |
| JP | 2002026471 A | 1/2002 |
| JP | 2003326726 | 11/2003 |
| JP | 2005262458 A | 9/2005 |
| JP | 2009258604 | 11/2009 |
| JP | 2010079199 | 4/2010 |
| JP | 2011113336 | 6/2011 |
| JP | 2012063770 | 3/2012 |
| JP | 2013197677 | 9/2013 |
| JP | 5644052 B2 | 12/2014 |
| JP | 2014534917 | 12/2014 |
| JP | 2016185664 | 10/2016 |
| JP | 2017196842 | 11/2017 |
| JP | 2018049141 | 3/2018 |
| JP | 2018136774 | 8/2018 |
| JP | 2018161785 | 10/2018 |
| JP | 2018531394 | 10/2018 |
| KR | 20080003539 A | 1/2008 |
| KR | 101785051 | 10/2017 |
| TW | 200707209 A | 2/2007 |
| TW | 201202948 A | 1/2012 |
| TW | 201546620 A | 12/2015 |
| WO | WO-2007107957 A1 | 9/2007 |
| WO | WO-2017174363 | 10/2007 |
| WO | WO-2008117194 A1 | 10/2008 |
| WO | WO-2009145774 A1 | 12/2009 |
| WO | WO-2012020443 | 2/2012 |
| WO | WO-2012054050 | 4/2012 |
| WO | WO2012054050 A1 | 4/2012 |
| WO | WO-2012057755 A1 | 5/2012 |
| WO | WO2013048430 A1 | 4/2013 |
| WO | WO-2015116092 | 8/2015 |
| WO | WO-2016061480 | 4/2016 |
| WO | WO-2016114759 | 7/2016 |
| WO | WO-2016130157 | 8/2016 |
| WO | WO-2013048430 | 5/2017 |
| WO | WO-2017074334 A1 | 5/2017 |
| WO | WO-2017074342 | 5/2017 |
| WO | WO-2017074342 A1 | 5/2017 |
| WO | WO-2017184147 A1 | 10/2017 |
| WO | WO-2017189009 | 11/2017 |
| WO | WO2017189009 A1 | 11/2017 |
| WO | WO-2017189010 A1 | 11/2017 |
| WO | WO2017189010 A1 | 11/2017 |
| WO | WO-2017189011 | 11/2017 |
| WO | WO2017189011 A1 | 11/2017 |
| WO | WO-2017189013 | 11/2017 |
| WO | WO-2018017066 | 1/2018 |
| WO | WO2018017066 A1 | 1/2018 |
| WO | WO-2018022038 | 2/2018 |
| WO | WO-2018186847 A1 | 10/2018 |
| WO | WO-2018199886 | 11/2018 |
| WO | WO-2018199891 | 11/2018 |
| WO | WO2018199891 A1 | 11/2018 |
| WO | WO-2018199895 | 11/2018 |
| WO | WO-2018217185 A1 | 11/2018 |
| WO | WO-2019017963 A1 | 1/2019 |
| WO | WO-2019078834 A1 | 4/2019 |
| WO | WO-2019078835 | 4/2019 |
| WO | WO-2019078839 | 4/2019 |
| WO | WO-2019078840 | 4/2019 |
| WO | WO-2019078843 | 4/2019 |
| WO | WO-2019078844 | 4/2019 |
| WO | WO-2019078845 | 4/2019 |

OTHER PUBLICATIONS

HP, "Development of the HP DeskJet 1200C Print Cartridge Platform", Feb. 1994, 9 pages.

International Searching Authority "International Search Report and Written Opinion" issued in connection with PCT/US2018/063624 dated Aug. 23, 2019, 13 pages.

International Searching Authority "International Search Report and Written Opinion" issued in connection with PCT/US2018/063630 dated Aug. 22, 2019, 15 pages.

International Searching Authority "International Search Report and Written Opinion" issued in connection with PCT/US2018/063633 dated Jul. 23, 2019, 12 pages.

(56) References Cited

OTHER PUBLICATIONS

International Searching Authority "International Search Report and Written Opinion" issued in connection with PCT/US2018/063643 dated Aug. 20, 2019, 13 pages.
International Searching Authority "International Search Report and Written Opinion" issued in connection with PCT/US2019/017511 dated Dec. 3, 2018, 12 pages.
International Searching Authority "International Search Report and Written Opinion" issued in connection with PCT/CN2019/026133 dated Aug. 26, 2019, 18 pages.
International Searching Authority "International Search Report and Written Opinion" issued in connection with PCT/US2018/063631 dated Aug. 23, 2019, 13 pages.
Maxim Integrated Products "1-to-8 I2C Bus Switches/Multiplexers with Bus Lock-Up Detection, Isolation, and Notification" dated Sep. 2008, 22 pages.
NXP "Introducing A10006 Secure Authenticator Tamper-Resistant Anti Counterfeit Solution", last retrieved on Jul. 3, 2019, 29 pages.
NXP Semiconductors N.V. "NXP 2-, 4-, and 8-channel I2C/SMBus muxes and switches PCA954x" released Apr. 1, 2014, 34 pages.
NXP Semiconductors N.V. "PCA9641: 2-channel I2C-bus master arbiter Product data Sheet" released Oct. 23, 2014, 77 pages.
Open Source Multi-head 3D printer for polymer metal composite component manufacturing.
PCA954x I2C-bus multiplexer, Jul. 2008, NXP Semiconductors.
PCA9641 I2C arbiter, Oct. 2014, NXP Semiconductors.
The I2C-Bus Specification Version 2.1 Jan. 2000 (Year: 2000), 46 pages.
United States Patent and Trademark Office, "Non-Final office action," issued in connection with U.S. Appl. No. 16/502,479, dated Dec. 11, 2019, 13 pages.
United States Patent and Trademark Office. "Non-Final Office action," issued in connection with U.S. Appl. No. 16/460,016, dated Sep. 12, 2019, 12 pages.
United States Patent and Trademark Office, "Non-Final Office action," issued in connection with U.S. Appl. No. 16/505,090, dated Sep. 10, 2019, 20 pages.
United States Patent and Trademark Office, "Notice of allowance," issued in connection with U.S. Appl. No. 16/460,016, dated Mar. 25, 2020, 10 pages.
United States Patent and Trademark Office, "Notice of Allowance," issued in connection with U.S. Appl. No. 16/505,090, dated Feb. 12, 2020, 9 pages.
United States Patent and Trademark Office, "Notice of Allowance," issued in connection with U.S. Appl. No. 16/728,207, dated Feb. 19, 2020 19 pages.

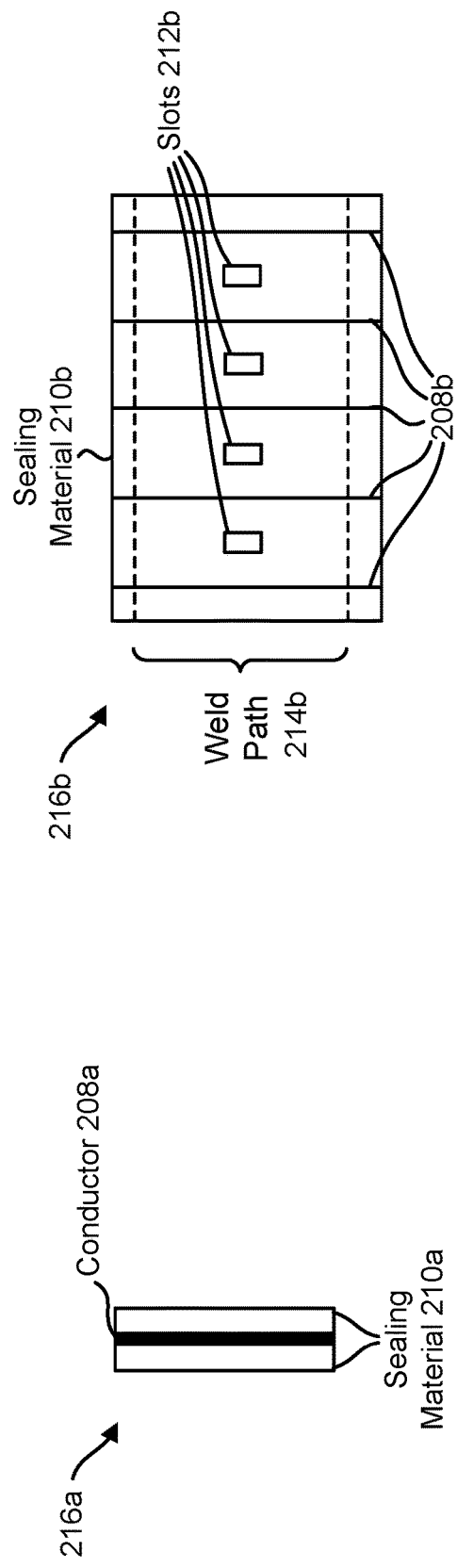
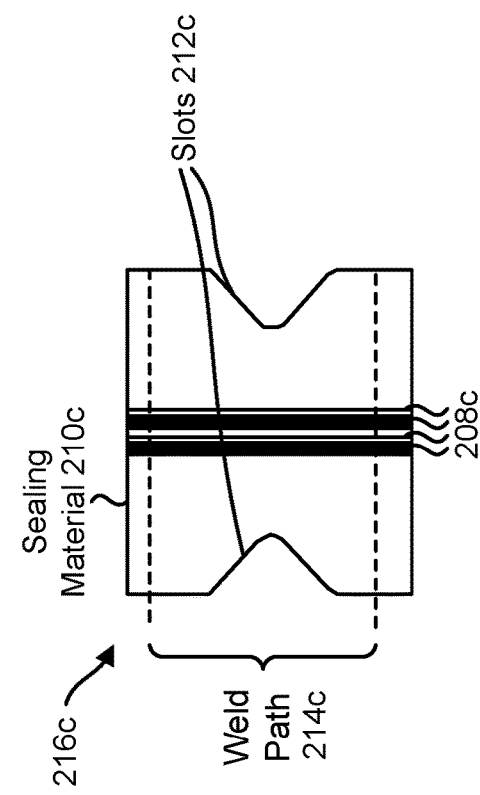

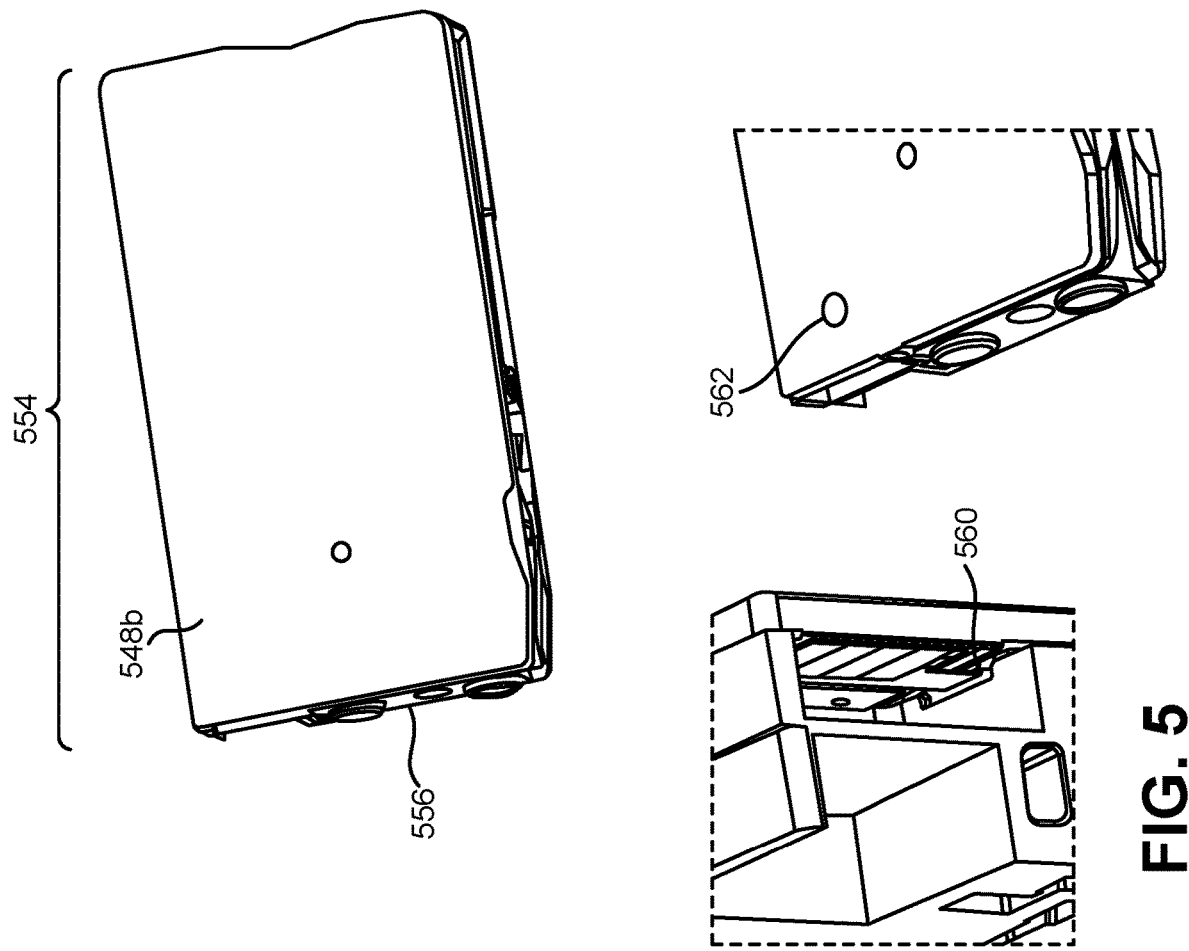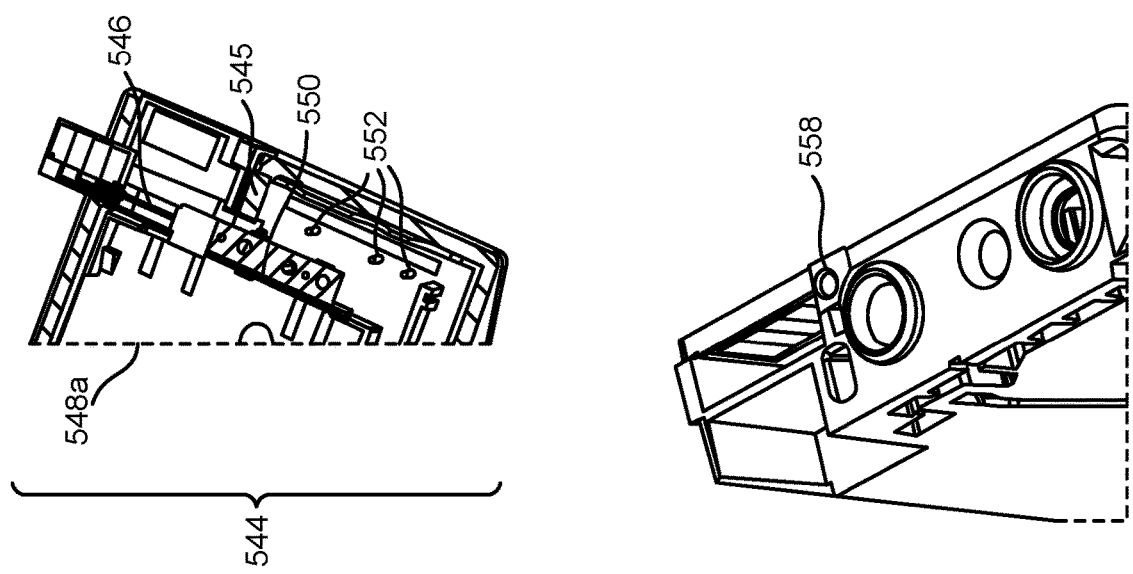
FIG. 5

PRINT LIQUID SUPPLY UNITS

RELATED APPLICATIONS

This application is related to and claims priority to PCT International Application No. PCT/US2018/063643, filed Dec. 3, 2018, for "LOGIC CIRCUITRY," and to PCT International Application No. PCT/US2019/026145, filed Apr. 5, 2019, for "LOGIC CIRCUITRY," which claims priority to PCT International Application No. PCT/US2018/063631, filed Dec. 3, 2018, to International Application No. PCT/US2018/063624, filed Dec. 3, 2018, to International Application No. PCT/US2018/063630, filed Dec. 3, 2018, to International Application No. PCT/US2018/063638, filed Dec. 3, 2018, and to International Application No. PCT/US2018/063643, filed Dec. 3, 2018.

BACKGROUND

Some types of printing utilize liquid. For example, some types of printing extrude liquid onto media or material to produce a printed product (e.g., two-dimensional (2D) printed content, three-dimensional (3D) printed objects). In some examples, a print head may be utilized to extrude ink onto paper to print text and/or images. In some examples, a print head may be utilized to extrude fusing agent onto material in order to form a 3D printed object.

BRIEF DESCRIPTION OF THE DRAWINGS

FIG. 2A is a diagram illustrating a side view of an example of a conductor or conductors and sealing material;

FIG. 2B is a diagram illustrating an example of an electrical connector;

FIG. 2C is a diagram illustrating an example of an electrical connector;

FIG. 5 is a diagram illustrating examples of techniques for manufacturing a print liquid container;

DETAILED DESCRIPTION

Figure 1:
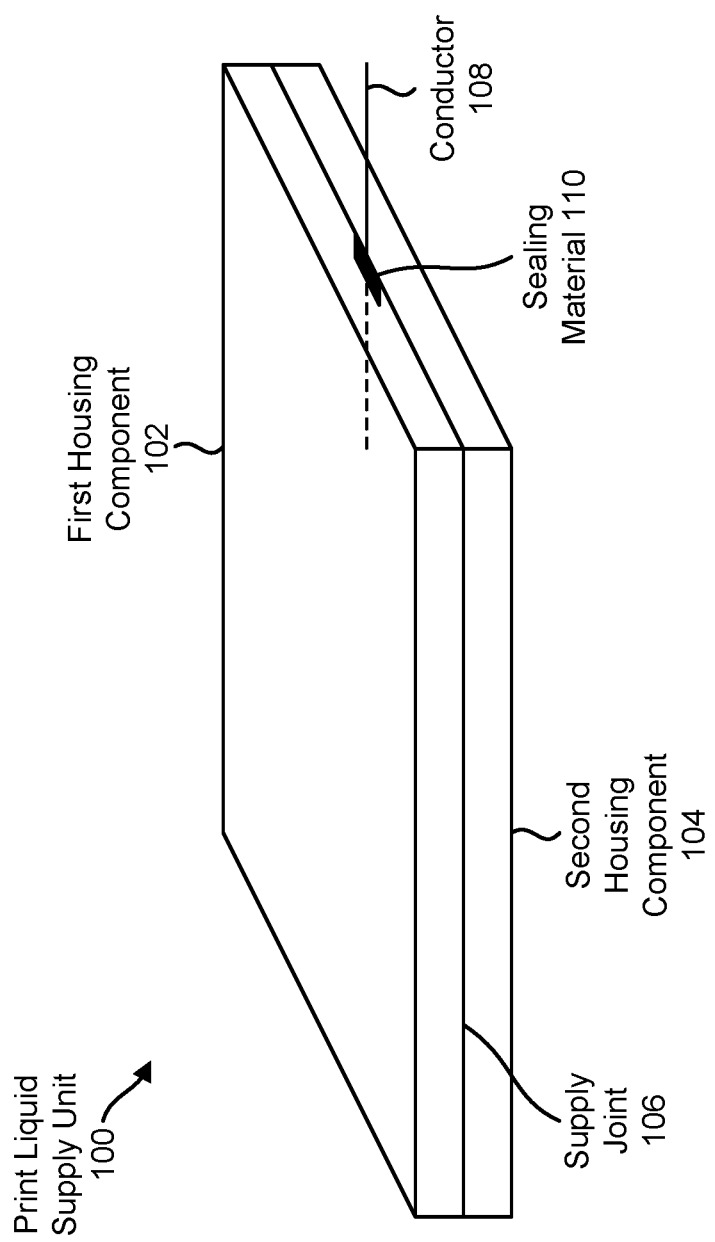
FIG. 1 is a diagram illustrating a perspective view of an example of a print liquid supply unit.

Some issues arise in the context of utilizing print liquid. Print liquid is a fluid for printing. Examples of print liquid include ink and fusing agent. In some examples, accurately sensing an amount of print liquid remaining in a reservoir may be difficult due to issues like liquid bridging, environmental conditions, and water vapor transmission rates. An inaccurately sensed liquid level may lead to changing the reservoir more often than necessary, wasting print liquid, and/or increasing printing expense. Accordingly, it may be beneficial to provide more delivered print liquid, a more reliable sensed print liquid level, and/or less ink supply changes.

A sensor or sensors may be utilized to increase print liquid level sensing accuracy. The sensor(s) may be housed in a print liquid supply unit. A print liquid supply unit is a container that holds print liquid. In some examples, a print liquid supply unit may be referred to as a print liquid container, a cartridge, a supply, print liquid supply cartridge, etc. The print liquid may be supplied to a printer. For example, four print liquid supplies may be utilized for a printer, which may include black, cyan, magenta, and yellow print liquid supplies. This may allow print liquid supplies with colors to be replaced individually. For example, a print liquid color that is used more often may be replaced individually without replacing remaining print liquid of another color or colors.

In some examples, print liquid supply units may be constructed of thermoplastics. Thermoplastics may be injection molded and may be compatible with high volume manufacturing and/or assembly methods. It may be beneficial for the construction materials (e.g., materials to construct components of the print liquid supply) to be compatible with the print liquid, to be robust to environmental conditions during shipping/handling, and/or to provide target water vapor transmission rates such that print quality is maintained over the life of the print liquid supply unit. In some examples, print liquid supply units may be constructed from thermoplastics such as polypropylene (PP), low-density polyethylene (LDPE), high-density polyethylene (HDPE), polyethylene terephthalate (PET), polycarbonate (PC), and/or blends thereof. Some thermoplastics may be compatible with high volume assembly methods such as ultrasonic welding, vibration welding, and/or laser welding. In some examples, welding (e.g., laser welding) may be capable of creating waterproof joint seals to contain the print liquid. As used herein, "welding," "weld," and variations thereof may denote laser welding, ultrasonic welding, and/or vibration welding. Other approaches for joining components may be excluded from the term "welding" (and variations thereof) in some examples.

Welding may be beneficial because plastic parts may be joined via high speed melting. For example, welding may not include utilizing another bonding agent or additional parts. Issues may arise when attempting to pass an electrical connection through a welded joint. For example, a sensor may be housed in a print liquid supply unit and may utilize a conductor that passes through a welded joint. Some examples of the techniques described herein may include providing an electrical connection through a joint (e.g., a joint that is at least partially welded) using double-sided pressure sensitive adhesive (PSA) gaskets, elastomeric gaskets, and/or various glue joints. In some examples, the electrical connection may pass through a separate seal that does not pass through the welded joint.

Throughout the drawings, identical reference numbers may designate similar, but not necessarily identical, elements. Similar numbers may indicate similar elements. When an element is referred to without a reference number, this may refer to the element generally, without necessary limitation to any particular Figure. The figures are not necessarily to scale, and the size of some parts may be exaggerated to more clearly illustrate the example shown. Moreover the drawings provide examples and/or implementations consistent with the description; however, the description is not limited to the examples and/or implementations provided in the drawings.

FIG. 1 is a diagram illustrating a perspective view of an example of a print liquid supply unit 100. Examples of the print liquid supply unit 100 include print liquid containers, cartridges, supplies, print liquid supply cartridges, etc. The print liquid supply unit 100 may contain and/or transfer print liquid (e.g., ink, agent, etc.). In some examples, the print liquid supply unit 100 may be designed to interface with a host device. A host device is a device that uses and/or applies print liquid. Examples of a host device include printers, ink jet printers, 3D printers, etc. For example, it may be beneficial to replenish or replace the print liquid supply unit 100 when some or all of the print liquid has been utilized.

In the example illustrated in FIG. 1, the print liquid supply unit 100 includes a first housing component 102 and a second housing component 104. The first housing component 102 and the second housing component 104 are structures for containing print liquid. For example, the first housing component 102 may be joined to the second housing component 104 to form a volume to contain print liquid. In some examples, the first housing component 102 and the second housing component 104 may be made of a thermoplastic or a combination of thermoplastics. In some examples, the first housing component 102 may be a lid of the print liquid supply unit and the second housing component 104 may be body of the print liquid supply unit.

The first housing component 102 may be welded to the second housing component 104 along a supply joint 106. The supply joint 106 is an interface between the first housing component 102 and the second housing component 104. In some examples, the first housing component 102 may be welded to the second housing component 104 along the supply joint 106 using laser welding, ultrasonic welding, and/or vibration welding. In some examples, welding may be applied along the entire supply joint 106. In other examples, welding may be applied along a portion (e.g., not the entire path) of the supply joint 106.

Welding may cause a phase change in the material of the first housing component 102 and/or the second housing component 104. For example, the second housing component 104 may have an opening on one side of the second housing component 104 to be closed with the first housing component 102 to make a waterproof seal for the print liquid. In some examples, the first housing component 102 and the second housing component 104 may be made of polypropylene material and may be joined using laser welding.

In some examples, the first housing component 102 may be press-fit to the second housing component 104 via a post or posts that serve to align the first housing component 102 and keep it on the second housing component 104 as the print liquid supply unit 100 enters a welder. Pressure may be applied to the print liquid supply unit 100. For example, a clamp may be applied to the first housing component 102 while the second housing component 104 is supported. A laser beam may be passed through the first housing component 102 to the underlying supply joint 106 geometry below. The second housing component 104 may absorb a portion (e.g., a majority) of the energy, which may cause the material of the second housing component 104 (along the supply joint 106, for example) to melt. The pressure and phase change of the material may cause the first housing component 102 to join to the second housing component 104. In some examples, because the print liquid supply unit 100 is under pressure, the print liquid supply unit 100 may collapse slightly, which may cause the material along the supply joint 106 to widen.

A conductor 108 may be situated through the supply joint 106. For example, the conductor 108 may be situated through the supply joint 106 from an outside of the print liquid supply unit 100 to an inside of the print liquid supply unit 100. In some examples, the inside of the print liquid supply unit 100 may contain print liquid. In some examples, the conductor 108 may be coupled to a sensor for the interior of the print liquid supply unit 100. In some examples, the conductor 108 may be coupled to an electrical interface (e.g., electrical connection pad(s)) for the exterior of the print liquid supply unit 100. The electrical interface may be utilized to communicate with a printer in some examples.

The conductor 108 may be a material that is able to conduct electricity or electrical signals. For example, the conductor 108 may be a metal wire or ribbon. In some examples, multiple conductors 108 may be situated through the supply joint 106.

The conductor 108 may be sealed in the supply joint 106 with a sealing material 110. The sealing material 110 is a material that provides a waterproof seal. For example, the sealing material 110 may prevent the print liquid from leaking from the inside of the print liquid supply unit 100 to the outside of the print liquid supply unit 100, while allowing the conductor 108 (or conductors 108) to pass through the supply joint 106. In some examples, the sealing material 110 may isolate and/or protect the conductor 108 from the print liquid. In some examples, a protective layer or layers may be utilized in combination with a sealing material or materials. For example, an overmolded protective layer or layers may be utilized to house a conductor or conductor(s) 108 and a sealing material 110 may be utilized to seal the supply joint 106 at the conductor(s) 108. In some examples, the protective layer or layers may not be sealing material. For instance, a protective layer or layers may house a conductor or conductors, and a sealing material may be applied outside of (e.g., on or around) the protective layer or layers to seal the supply joint around the protective material and conductor(s). In some examples, the protective layer(s) may be plastic, rubber, elastomeric material, adhesive(s), film(s), etc. In some examples, the protective layer or layers may be sealing material.

Some examples of the sealing material 110 may include plastic, rubber, elastomeric material, thermoplastic elastomer (TPE), and/or pressure sensitive adhesive (PSA). For instance, examples of the sealing material 110 include pressure sensitive adhesive gaskets, elastomeric gaskets, adhesives, layers, films, etc. In some examples, the sealing material 110 may be flexible or rigid. In some examples, the sealing material 110 may be transmissive or non-transmissive. A transmissive sealing material 110 may allow welding (e.g., laser welding, ultrasonic welding, vibration welding) to be performed through the sealing material 110. For example, transmissive plastic, transmissive rubber, or transmissive thermoplastic elastomer may allow the transmission of a welding laser beam through the sealing material 110. In some examples, the sealing material 110 may have a melting temperature that is greater than a melting temperature of material along the supply joint 106. Using a sealing material 110 with a greater melting temperature may allow welding techniques to be performed while reducing or eliminating damage to the seal and/or the conductor 108. In some examples, the sealing material 110 may be compatible with the print liquid. For example, the sealing material 110 may not significantly degrade in the presence of print liquid and/or may not negatively impact the quality of the print liquid.

In some examples, welding may be performed with a weld (e.g., ultrasonic weld, laser weld) that is not applied along a portion of the supply joint 106 with the sealing material 110. For instance, the sealing material 110 may be non-transmissive and the weld may not be applied over the sealing material 110 to avoid damaging the sealing material 110 and/or conductor(s) 108.

In some examples, the sealing material 110 may be an overmolded protective layer or layers on the conductor 108 or conductors 108. For example, a conductor 108 or conductors 108 may be embedded within (e.g., sandwiched between) the sealing material 110.

FIG. 2A is a diagram illustrating a side view of an example of a conductor or conductors 208*a* and sealing material 210*a*. In this example, the sealing material 210*a* may include an overmolded protective layer or layers of transmissive or non-transmissive plastic, rubber, or thermoplastic elastomer. In some examples, the thickness of the sealing material 210*a* and the conductor(s) 208*a* may range between 0.2 millimeters (mm) and 1 mm. In some examples, a combination of conductor(s) and sealing material may be referred to as an electrical connector. For instance, FIG. 2A illustrates an example of an electrical connector 216*a* that includes conductor(s) 208*a* and sealing material 210*a*. In some examples, the sealing material 210*a* may be transmissive and welding (e.g., a welding laser) may pass over and/or through the electrical connector 216*a* (e.g., through the sealing material 210*a*). In some examples, the electrical connector 216*a* may be rigid or compressive. The term "compressive" may denote compressible material.

FIG. 2B is a diagram illustrating an example of an electrical connector 216*b*. The electrical connector 216*b* includes sealing material 210*b*, conductors 208*b*, and slots 212*b*. In the example illustrated in FIG. 2B, the conductors 208*b* are metal conductors included in a flexible electrical connector 216*b*. A slot is an opening in material. In some examples, sealing material may include a slot or slots. A slot may be located in sealing material or at an edge of sealing material. For example, the sealing material 210*b* illustrated in FIG. 2B includes four slots 212*b*. When welded, joint material may be situated in a slot. In some examples, a slot may be located between conductors. For example, the slots 212*b* may be created in the electrical connector 216*b* between conductors 208*b*. In the example of FIG. 2B, the electrical connector 216*b* is situated in a weld path 214*b*. The weld path 214*b* is a path along which welding is performed. For example, a weld path 214*b* may be located in a supply joint. During welding, the slots 212*b* may allow joint material to flow through the slots 212*b* to create a mechanically locked compression joint with improved robustness. In some examples, rigid or compressive electrical connectors may be implemented in a supply joint or weld path.

FIG. 2C is a diagram illustrating an example of an electrical connector 216*c*. The electrical connector 216*c* includes sealing material 210*c*, conductors 208*c*, and slots 212*c*. In the example illustrated in FIG. 2B, the conductors 208*c* are metal conductors included in a flexible electrical connector 216*c*. In the example shown in FIG. 2C, the slots 212*c* are at edges of the sealing material 210*c*. The slots 212*c* form a neck geometry that is narrower in the center of the weld path 214*c*. This neck geometry may beneficially reduce a distance across the electrical connector 216*c* for sealing. In some examples, the neck geometry may be utilized for a rigid or compressive electrical connection. Other geometries that narrow within a weld path may be utilized. A slot located at an edge may be referred to as an edge feature. For example, the sealing material 210*c* illustrated in FIG. 2C includes two slots 212*c*. In the example of FIG. 2C, the electrical connector 216*c* is situated in a weld path 214*c*. During welding, the slots 212*c* on the outer edges may allow joint material to flow through the slots 212*c* to create a mechanically locked compression joint with improved robustness. In some examples, a combination of various geometries (e.g., squares, rectangles, triangles, trapezoids, circles, ovals, and/or combinations thereof) may be utilized. In some examples, a protective layer or layers may include a slot or slots. In some examples, sealing material and/or protective layer(s) may not include a slot or slots.

Figure 3:
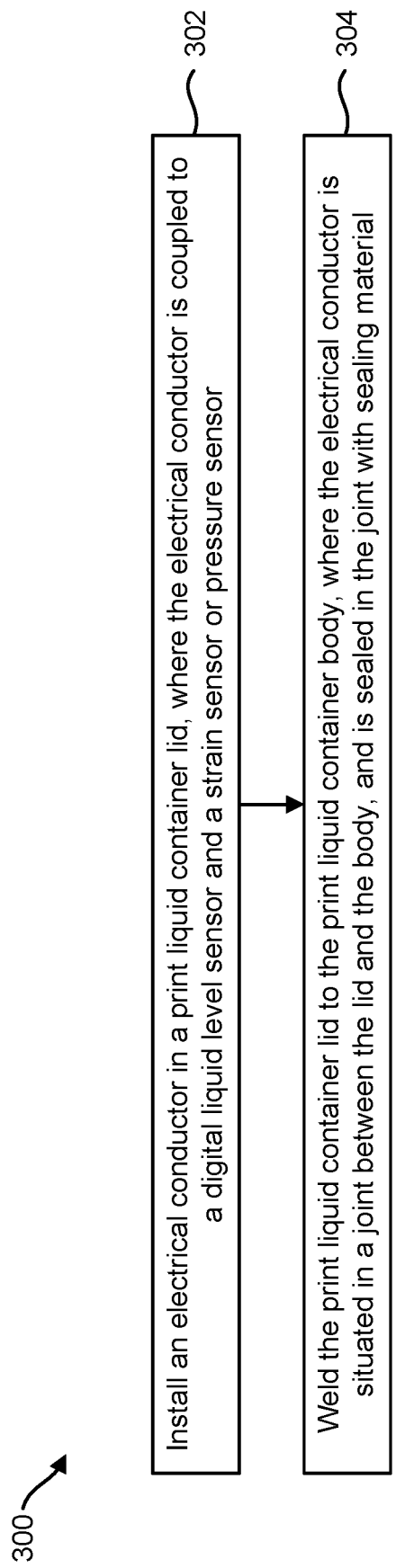
FIG. 3 is a flow diagram illustrating one example of a method for manufacturing a print liquid container.

FIG. 3 is a flow diagram illustrating one example of a method 300 for manufacturing a print liquid container. In some examples, the method 300 may be performed by an assembly machine or machines. The method 300 may include installing 302 an electrical conductor in a print liquid container lid. The electrical conductor may be coupled to a digital liquid level sensor and/or a strain sensor or pressure sensor. For example, the digital liquid level sensor and/or the strain sensor may be placed on a lid. In some examples, a carrier of the digital liquid level sensor and/or strain sensor may be placed on a post or posts of the lid. In some approaches, the digital liquid level sensor may include an array of heaters and temperature sensors. Measurements from the digital liquid level sensor may but utilized to determine a print liquid level. For example, the digital print liquid level sensor may activate the array of heaters and measure the temperature at different levels. Lesser temperatures may correspond to heaters and temperature sensors that are below the print liquid level. Greater temperatures may correspond to heaters and temperature sensors that are above the print liquid level. The measured temperatures may indicate the level of the print liquid due to the different specific heats of print liquid and air.

In some examples, a strain sensor or a pressure sensor may be utilized to detect a condition (e.g., pressure and/or structural condition) in the print liquid container. For instance, the print liquid container may include a pressure chamber in some examples. The pressure chamber is a device that changes structure based on pressure. The pressure chamber may be expandable and collapsible. An example of a pressure chamber is a bag. In some examples, the pressure chamber may be utilized to regulate pressure (e.g., to avoid over-pressurization and/or under-pressurization due to altitude and/or temperature variations) inside of the print liquid container. In some examples, the pressure chamber may be expanded (e.g., inflated) in order to purge print liquid from a print head for servicing. In some examples, the strain sensor may be utilized to detect structural deflection of the print liquid container due to expansion of the pressure chamber. In some examples, the pressure sensor may be utilized to detect a pressure change in the print liquid container due to the expansion of the pressure chamber.

The method 300 may also include welding 304 the print liquid container lid to a print liquid container body. The electrical conductor may be situated in a joint between the print liquid container lid and the print liquid container body. The electrical conductor may be sealed in the joint with sealing material. In some examples, the sealing material may include pressure-sensitive adhesive, a gasket, elastomeric material, or other sealant (e.g., non-elastomeric sealant). Some examples of sealants may include 1 or 2 part epoxy type sealants. Some epoxy type sealants may not be elastomeric in liquid form or after curing.

In some examples, the method 300 may include applying the sealing material by installing the sealing material in the print liquid container lid and/or the print liquid container body before welding the print liquid container lid to the print liquid container body. For example, a gasket or double-sided pressure sensitive adhesive may be applied to the print liquid container lid. Another gasket or double-sided pressure sensitive adhesive may be applied to the print liquid container body. After installing the sealing material in the print liquid container lid and/or in the print liquid container body, the print liquid container lid may be welded to the print liquid container body. In some examples, welding the print liquid container lid to the print liquid container body may include performing ultrasonic welding or laser welding between the print liquid container lid and the print liquid container body while avoiding welding a region of the electrical conductor in the joint.

In some examples, the method 300 may include applying the sealing material by injecting the sealing material into the joint via a port or ports. For example, the print liquid container lid may be welded to the print liquid container body before applying the sealing material. For instance, the electrical conductor, the digital liquid level sensor and/or the strain sensor or pressure sensor may be installed in the print liquid container lid, and the print liquid container lid may be welded to the print liquid container body using laser welding or ultrasonic welding. After welding, the sealing material (e.g., adhesive or sealant) may be injected into a port or ports in the print liquid container lid and/or the print liquid container body.

In some examples, electrical connector protective material may be a compressible (e.g., elastomeric) non-transmissive sealing material. For example, the electrical connector protective material may be compressible rubber and/or thermoplastic elastomer that is non-transmissive and/or that has a melting temperature that is too low to withstand welding (e.g., laser and/or ultrasonic welding). In some examples, sealing may be performed around the electrical connector using elastomeric material to create the seal (instead of adding gaskets and/or pieces of pressure sensitive adhesive, for instance). In some examples, the electrical connector and/or sensor may be installed with an electrical connector in the joint. The print liquid container lid may be welded to the print liquid container body. Laser and/or ultrasonic welding may be performed while omitting welding in a region over the electrical connector protective material to avoid damaging the protective material. As the print liquid container lid collapses during welding, the compression may seal the material around the electrical connector, to the print liquid container lid, to the print liquid container body, and/or to the material on both sides of the joint that interfaces with the electrical connector.

Figure 4:
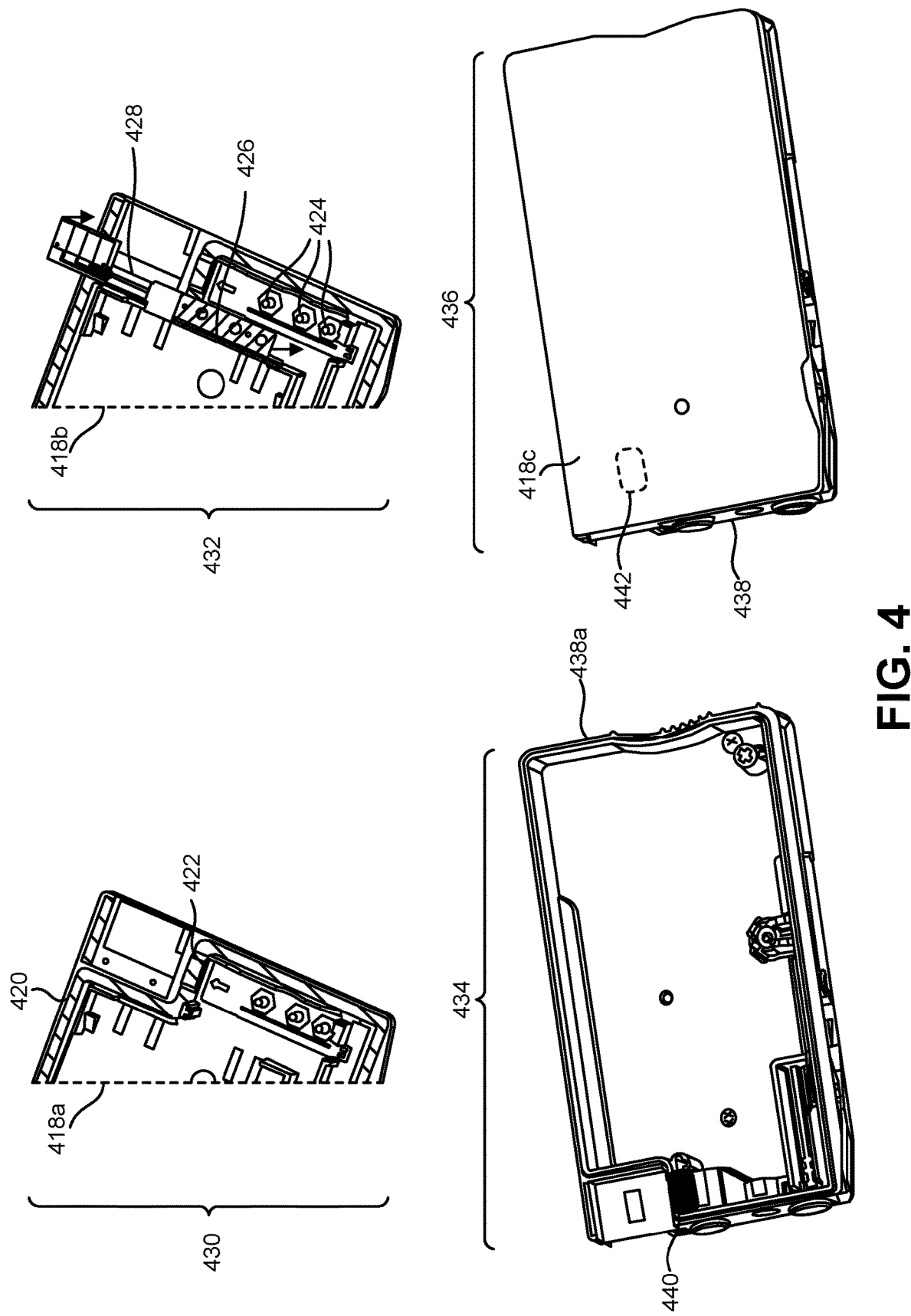
FIG. 4 is a diagram illustrating examples of techniques for manufacturing a print liquid container.

FIG. 4 is a diagram illustrating examples of techniques for manufacturing a print liquid container. In a first procedure 430, first sealing material 422 is applied to a print liquid container lid 418a. Examples of the first sealing material 422 may include a gasket or double-sided pressure sensitive adhesive. The first sealing material 422 may be applied on a joint path 420.

In a second procedure 432, electrical conductors 428 are installed on the print liquid container lid 418b (over the first sealing material 422, for example). The electrical conductors 428 are coupled to a sensor 426. The sensor 426 may include digital liquid level sensor and/or a strain sensor or pressure sensor. The sensor 426 may also be installed on the print liquid container lid 418b. For example, a carrier that supports the sensor 426 may be installed on posts 424 of the lid 418b.

In a third procedure 434, second sealing material 440 is applied to a print liquid container body 438a. The second sealing material 440 may be applied in a joint area. Examples of the second sealing material 440 may include a gasket or double-sided pressure sensitive adhesive.

In a fourth procedure 436, the print liquid container lid 418c may be welded to (e.g., assembled with) the print liquid container body 438b. For example, welding the print liquid container lid 418c to the print liquid container body 438b may include performing ultrasonic welding or laser welding between the print liquid container lid 418c and the print liquid container body 438b while avoiding welding a region 442 of the electrical conductor in the joint. In some examples, the welding (e.g., laser or ultrasonic welding) may be performed using compression from the joint collapse to seal the joint with the sealing materials 422, 440 (e.g., gaskets and/or double-side pressure sensitive adhesives) while omitting welding the region 442 above sealing materials 422, 440 to avoid damaging the sealing materials 422, 440 and/or the electrical conductors 428. The compression may seal the sealing materials 422, 440 around the electrical conductors 428, to the print liquid container lid 418c, to the print liquid container body 438b, and/or to the material on both sides of the joint that interfaces with the sealing materials 422, 440.

The procedures 430, 432, 434, 436 described in connection with FIG. 4 may be performed in different orders in some examples. For example, the third procedure 434 may be performed before the first procedure 430 and/or before the second procedure 432 in some approaches.

FIG. 5 is a diagram illustrating examples of techniques for manufacturing a print liquid container. In a first procedure 544, electrical conductors 546 are installed on the print liquid container lid 548a (with the electrical conductors 546 placed over the joint 545, for example). The electrical conductors 546 are coupled to a sensor 550. The sensor 550 may include digital liquid level sensor and/or a strain sensor or pressure sensor. The sensor 550 may also be installed on the print liquid container lid 548a. For example, a carrier that supports the sensor 550 may be installed on posts 552 of the lid 548a.

In a second procedure 554, the print liquid container lid 548b may be welded to the print liquid container body 556. For example, welding the print liquid container lid 548b to the print liquid container body 556 may include performing ultrasonic welding or laser welding between the print liquid container lid 548b and the print liquid container body 556. In some examples, the welding may be performed over the electrical conductors 546. In some examples, the welding (e.g., laser or ultrasonic welding) may be performed while omitting welding a region above the electrical conductors 546 to avoid damaging or the electrical conductors 546. Whether the welding is performed over the electrical conductors 546 may depend on connector transmissivity.

In some examples, sealing material may be applied by injecting the sealing material into the joint 545 via a port or ports. In the diagram illustrated in FIG. 5, examples of ports 558, 560, 562 on examples of portions of print liquid containers are illustrated. A procedure may include injecting the sealing material into one, some, or all of the ports 558, 560, 562 illustrated. For instance, sealing material (e.g., adhesive and/or sealant) may be injected in order to seal an area around the electrical conductors 546. For example, sealing material may be injected into a front port 558, into a top port 562, and/or into a side port 560.

Figure 6:
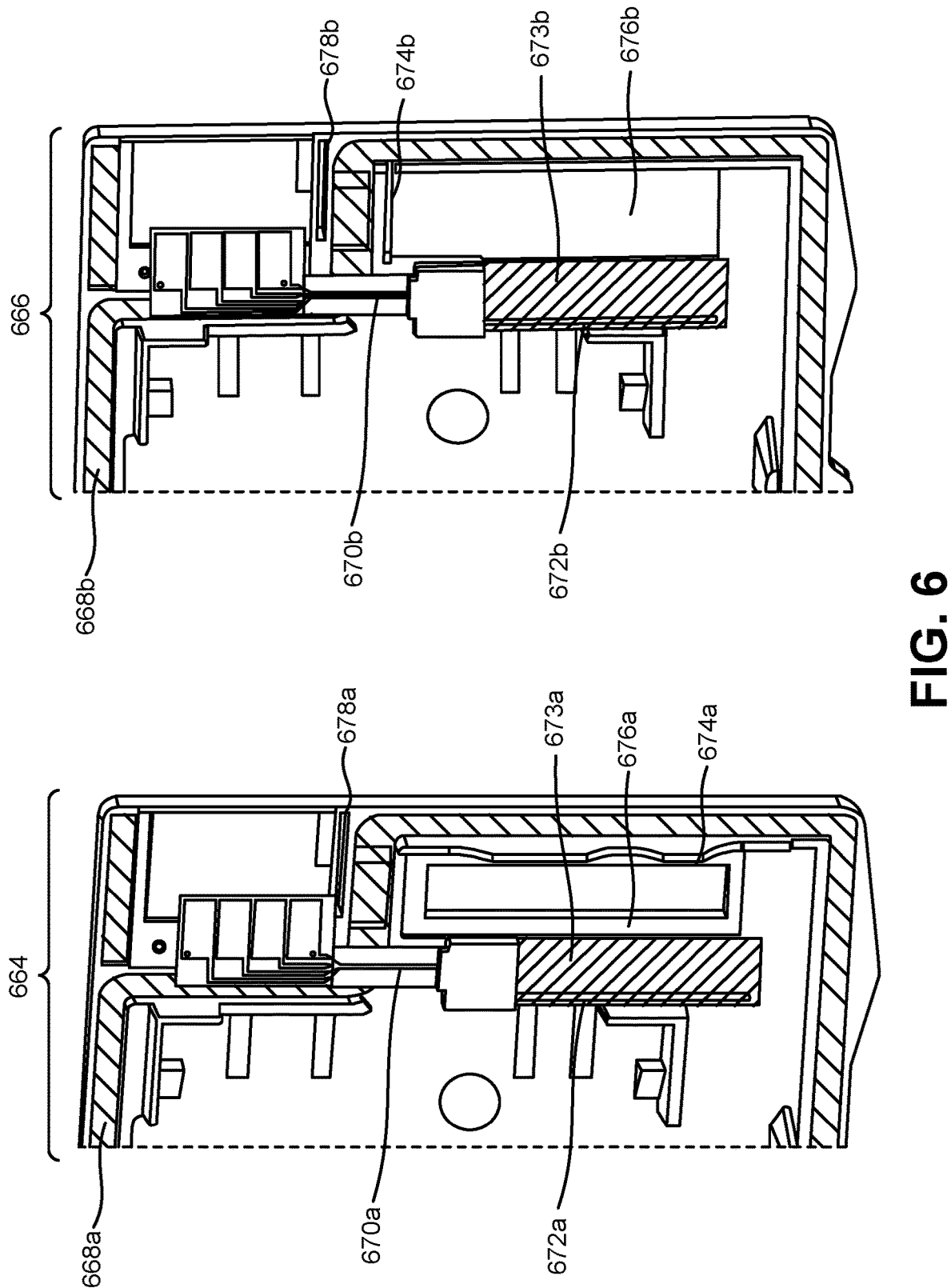
FIG. 6 is a diagram illustrating examples of print liquid container components.

FIG. 6 is a diagram illustrating examples of print liquid container components 664, 666. In some examples, an electrical conductor 670a may not pass through a joint 668a. In some examples, a print liquid container may include a container property sensor 672a. The container property sensor 672a may include a liquid level sensor (e.g., digital liquid level sensor), temperature sensor, strain sensor, and/or pressure sensor. In some examples, the container property sensor 672a may be provided on a substrate (e.g., silicon substrate), which may be supported by a carrier 673a. The container property sensor 672a may be connected to a container wall 676a. In some examples, the container property sensor 672a may be indirectly connected to the container wall. For instance, the container property sensor 672a may be provided on a substrate, which is supported by the carrier 673a, which carrier 673a may be adhered or welded (e.g., sealed) to the wall. Accordingly, a container property sensor 672a may be connected to a container wall 676a of the print liquid container component 664. The container property sensor 672a may include a strain sensor or a pressure sensor that is connected to the container wall 676a. In some examples, the container property sensor 672a may include a digital liquid level sensor. The electrical conductor 670a may be coupled to the property sensor 672a. The electrical conductor 670a may pass through a slot 674a in the container wall 676a. The slot 674a may be distanced from the joint 668a of container shells. For example, the illustrated liquid container component 664 may be part of a container shell (e.g., a print liquid container lid). The joint 668a may be joined to a counterpart container shell (e.g., a print liquid container body). In some examples, an electrical conductor 670a may bypass the joint 668a and utilize a secondary seal around the electrical conductor 670a (e.g., flexible conductor) and/or the container property sensor 672a.

In some examples, the supply joint 668a may be sealed using laser welding, ultrasonic welding, vibration welding, and/or adhesive, etc. In some examples, the electrical conductor 670a and/or a container property sensor 672a carrier 673a may be sealed to the print liquid container component 664 (e.g., print liquid container lid) with adhesive, gaskets, and/or pressure sensitive adhesive, etc.

In some examples, a slot 674a in the container wall 676a below the joint 668a may be used to seal the container property sensor 672a to the print liquid container component 664. For example, the electrical conductor 670a (e.g., electrical connector) may be passed through the slot 674a in the container wall 676a. In some examples, this may be accomplished by rotating the electrical conductor 670a with the top edge of the electrical connector passing through the slot 674a and then rotating the electrical conductor 670a such that the back side of the container property sensor 672a carrier 673a may be sealed to the inside of the print liquid container component 664. In some examples, the electrical conductor 670a (e.g., electrical connection) may be rotated upward toward the bottom of the lid to avoid interfering with the sealing procedure of the joint 668a. After the joint 668a is sealed, the electrical conductor 670a (e.g., electrical connector) may be passed through an opening 678a above the joint to route the electrical conductor 670a to a position on the print liquid container component 664 (e.g., print liquid container lid). As can be observed, the container wall 676a may include an interior recess for installing the container property sensor 672a (from the interior, for instance).

In some examples, the conductor 670a (e.g., connector) may be passed through the slot 674a first. Then, the back of the container property sensor 672a carrier 673a may be sealed to the interior recess of the print liquid container component 664. Then, the joint 668a may be sealed (e.g., the print liquid container lid may be sealed to a print liquid container body). Then, the conductor 670a (e.g., connector) may be passed through the opening 678a.

In some examples, a container property sensor may be installed in a recess in the container wall from the outside of the print liquid container component. This approach may simplify the assembly because the joint may be sealed first, and then the container property sensor carrier may be sealed to the print liquid container component (e.g., print liquid container lid) on the exterior. Then, the electrical conductor (e.g., electrical connector) may be passed through the opening above the joint.

In some examples, an electrical conductor 670b may not pass through a joint 668b. In some examples, a print liquid container may include a container property sensor 672b. The container property sensor 672b may include a liquid level sensor (e.g., digital liquid level sensor), temperature sensor, strain sensor, and/or pressure sensor. In some examples, the container property sensor 672b may be provided on a substrate (e.g., silicon substrate), which may be supported by a carrier 673b. The container property sensor 672b may be connected to a container wall 676b. In some examples, the container property sensor 672b may be indirectly connected to the container wall. For instance, the container property sensor 672b may be provided on a substrate, which is supported by the carrier 673b, which carrier 673b may be adhered or welded (e.g., sealed) to the wall. Accordingly, a container property sensor 672b may be connected to a container wall 676b of the print liquid container component 666. The container property sensor 672b may include a strain sensor or a pressure sensor that is connected to the container wall 676b. In some examples, the container property sensor 672b may include a digital liquid level sensor. The electrical conductor 670b may be coupled to the property sensor 672b. The electrical conductor 670b may pass through a slot 674b in the container wall 676b. The slot 674b may be distanced from the joint 668b of container shells. For example, the illustrated liquid container component 666 may be part of a container shell (e.g., a print liquid container lid). The joint 668b may be joined to a counterpart container shell (e.g., a print liquid container body). In some examples, an electrical conductor 670b may bypass the joint 668b and utilize a secondary seal around the electrical conductor 670b (e.g., flexible conductor) and/or the container property sensor 672b.

In some examples, the supply joint 668b may be sealed using laser welding, ultrasonic welding, vibration welding, and/or adhesive, etc. In some examples, the electrical conductor 670b and/or a container property sensor 672b carrier 673b may be sealed to the print liquid container component 666 (e.g., print liquid container lid) with adhesive, gaskets, and/or pressure sensitive adhesive, etc.

In some examples, a slot 674b in the container wall 676b below the joint 668b may be used to seal the container property sensor 672b carrier 673a to the print liquid container component 666. For example, the electrical conductor 670b (e.g., electrical connector) may be passed through the slot 674b in the container wall 676b. In this example, a smaller slot 674b may be utilized to pass through the container wall 672b. In some examples, the electrical conductor 670a (e.g., electrical connector) may be passed through the slot 674b below the joint 668b. The joint 668b may be sealed. Then, the electrical conductor 670*a* (e.g., electrical connector) may be passed through the opening 678*b* above the joint 668*b*. The slot 674*b* may be sealed. For example, the slot 674*b* below the joint 668*b* may be sealed to the print liquid container component (e.g., print liquid container lid).

In some examples, the conductor 670*b* (e.g., connector) may be passed through the slot 674*b* first. Then, the joint 668*b* may be sealed (e.g., the print liquid container lid may be sealed to a print liquid container body). Then, the conductor 670*a* (e.g., connector) may be passed through the opening 678*b*. Then, the slot 674*b* may be sealed to the conductor 670*b* (e.g., connector).

In some examples, an exterior recess or relief may be implemented for an electrical conductor 670*a*-*b*, such that the electrical conductor 670*a*-*b* may be flush with the exterior surface of the print liquid container component 664, 666. In some examples, a cover (e.g., cosmetic label, sticker, etc.) may be placed over the electrical conductor 670*a*-*b* (e.g., electrical connector) and/or the container property sensor 672*a*-*b* carrier 673*a*-*b* on the exterior.

While some of the examples are described herein in terms of laser welding through a transmissive thin flexible, elastomeric (e.g., compressive) or rigid electrical conductor, other techniques may be utilized in accordance with the disclosure. For example, some electrical conductor seals that may not be transmissive may be sealed in the joint using ultrasonic or vibration welding instead of laser welding.

Some examples of the techniques described herein may be beneficial. For example, some of the approaches and/or structures for passing a conductor or connector through a joint or through a container wall may be compatible with mass production approaches. The ability to use different materials to seal the conductor or connector may enable using materials that are compatible with different print liquids.

Figure 8:
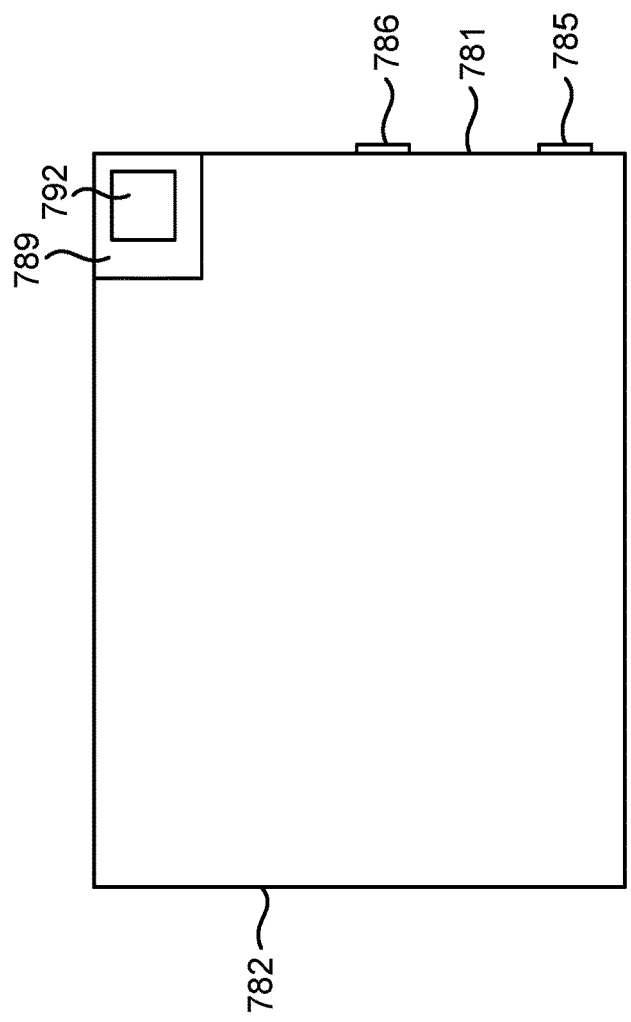
FIG. 8 is a cross-sectional view through the line C-C of the example print liquid supply cartridge of FIG. 7.
Figure 7:
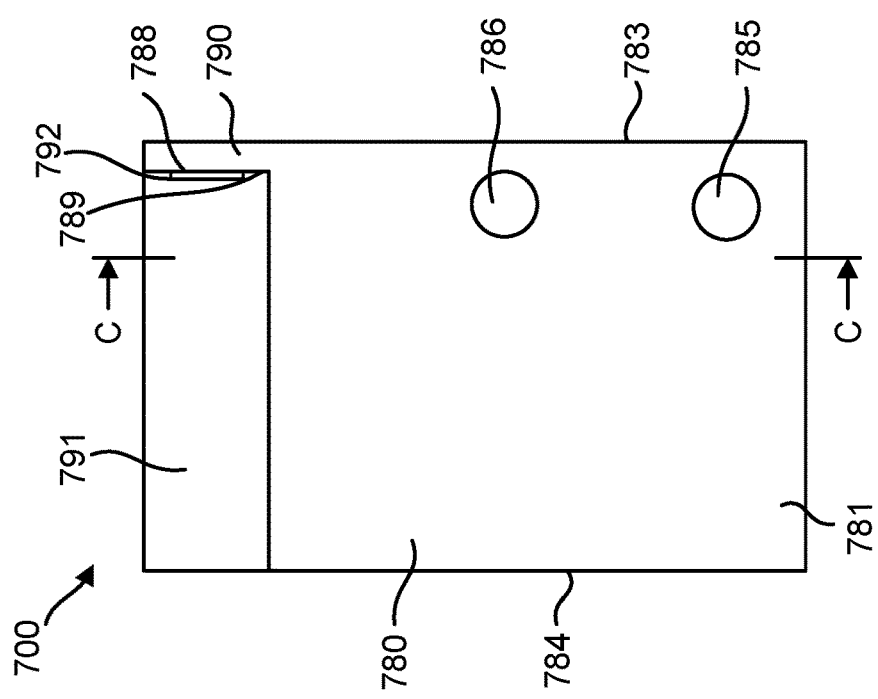
FIG. 7 shows an example print liquid supply cartridge.

FIG. 7 shows an example print liquid supply cartridge 700. In some examples, the print liquid supply cartridge 700 may be an example of the print liquid supply unit 100 described in connection with FIG. 1, an example of the print liquid container described in connection with FIG. 4, and/or an example of the print liquid container described in connection with FIG. 5. In some examples, the print liquid container components 664, 666 may be implemented with the print liquid supply cartridge 700. More particularly, FIG. 7 shows a plan view of the example cartridge 700. The cartridge 700 has a housing 780 which encloses an internal volume in which the print liquid, such as ink or agent, can be stored. The internal volume of the example cartridges described herein may be between approximately 10 milliliters to approximately 50 or approximately 100 milliliters. The housing 780 has a front end 781, a rear end 782 and first and second sides 783, 784 extending from the front end to the rear end. The front end 781 and the rear end 782 can be seen also in FIG. 8, which is a cross-sectional view through the line C-C of the example print liquid supply cartridge of FIG. 7. The housing 780 may comprise two relatively hard plastic shells which directly contain the print liquid therebetween. In the example, the height of the housing is greater than the width of the housing. Similarly, the height of the internal volume is greater than the width of the internal volume. The height of the internal volume is defined by the height of the first and second sides and the width of the internal volume is defined by the distance between the first and second sides.

The front end 781 may have a print liquid outlet 785 through which the print liquid can be supplied to a printer, for example by insertion of a fluid pen of the printer therein. The print liquid outlet 785 may be provided closer to the bottom than to the top of the front end 781.

A gas inlet 786 may be provided on the front end 781 also, to enable gas such as air to be supplied to the cartridge, for example by insertion of a fluid pen of the printer therein. The gas inlet 786 may be positioned above the print liquid outlet 785.

A first wall 788 having an internal side 789 and an external side 790 may be provided to delimit a recess 791. In the example shown, the recess 791 extends from the first wall 788 across the entire width of the front end 781. The first wall 788 thus overhangs a notched corner of the housing. The external side 790 of the first wall 788 may be part of the first side 783 of the housing 780. Electrical connection pads 792 are exposed on the internal side of the first wall, as shown also in FIG. 8. The electrical connection pads 792 are indicated by a single block in FIGS. 7 and 8. In one example, there are three electrical connection pads, although fewer or more connection pads may be provided. The electrical connection pads may be arranged in a top to bottom direction. The electrical connection pads enable electrical signals to be communicated between electrical circuitry of the cartridge and electrical circuitry of the printer, for example in accordance with an inter-integrated circuit (I2C) data communication protocol. Hence, the connection pads may form an I2C data interface. Providing the electrical connection pads 792 to the first wall 788 allows for easy mounting of the electrical connection pads 792 on the cartridge. Being positioned on the internal side 789, the electrical connection pads 792 are protected from damage when shipping and handling the cartridge. The recess 791 can receive an electrical connector of a printer to establish an electrical connection between the electrical connection pads 792 and the electrical connector.

Figure 9:
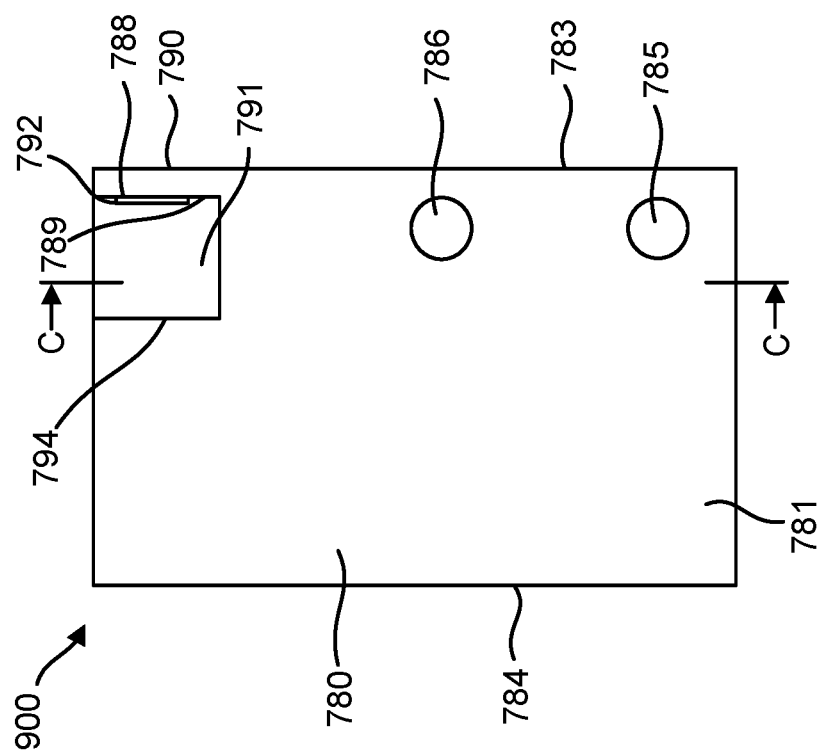
FIG. 9 shows another example print liquid supply cartridge.

FIG. 9 shows another example print liquid supply cartridge 900. In particular, FIG. 9 shows a plan view of the cartridge 900. The example cartridge of FIG. 9 is similar to that of FIG. 7. In the example of FIG. 9, the recess 791 does not extend across the entire width of the front end 781. The recess 791 is delimited by a second wall 794. The recess 791 between the first wall 788 and the second wall 794 may receive an electrical connector of a printer therein to contact the electrical connection pads 792.

Figures 10A, 10B:
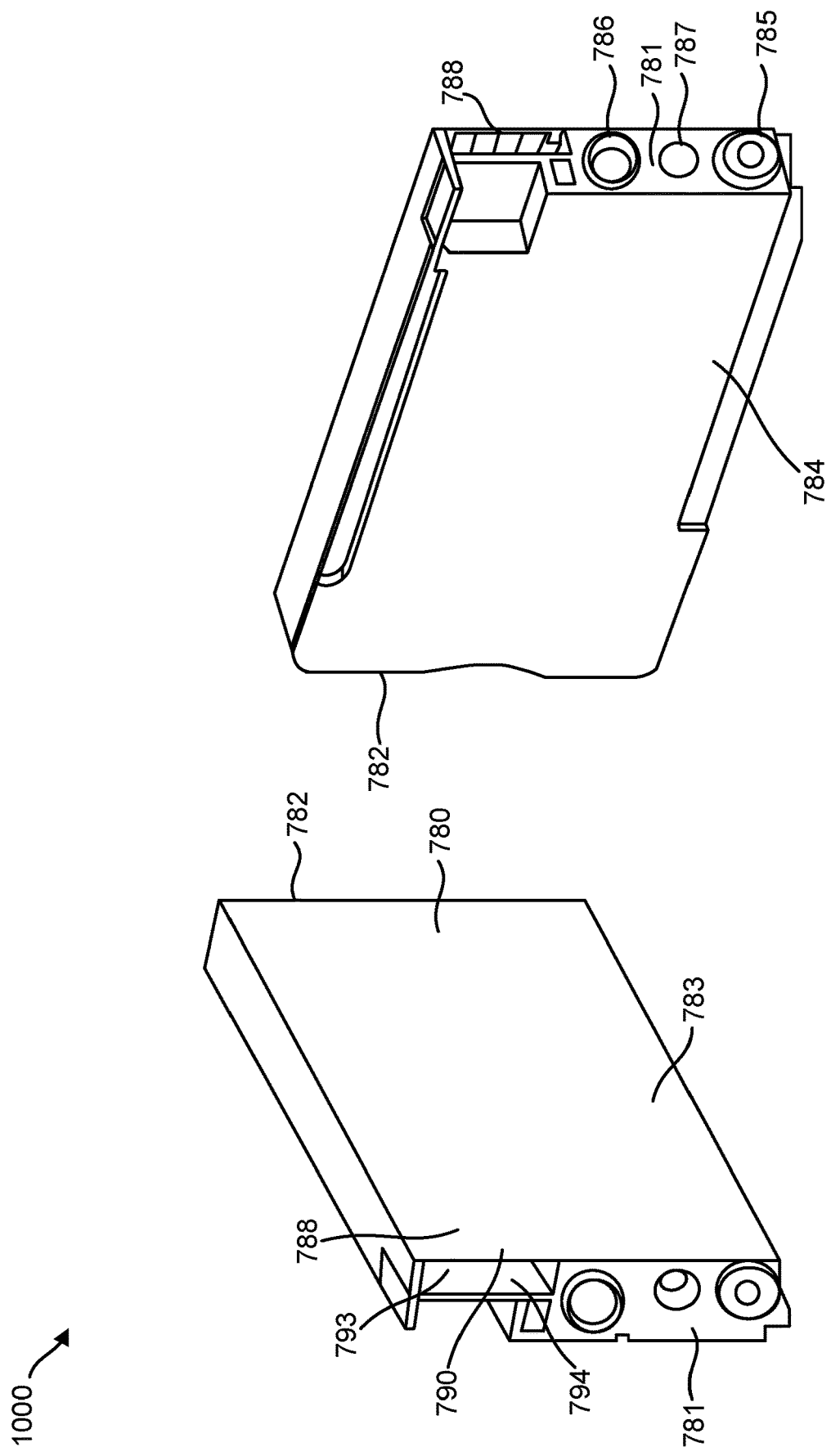
FIG. 10A and FIG. 10B are perspective views of another example print liquid supply cartridge.
Figure 11:
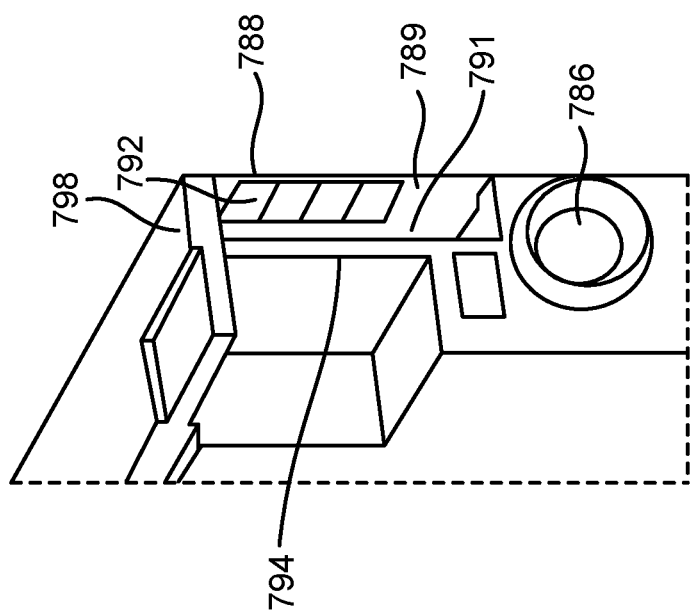
FIG. 11 is a magnified view of part of the example cartridge.

FIGS. 10A and 10B are perspective views of another example print liquid supply cartridge 1000. FIG. 11 is a magnified view of part of the example cartridge 1000. The same reference numerals are used for like parts. The cartridge 1000 has a housing 780 which encloses an internal volume in which the print liquid, such as ink or agent, can be stored. The housing 780 has a front end 781, a rear end 782, and first and second sides 783, 784 extending from the front end to the rear end. A print liquid outlet 785 and a gas inlet 786 may be provided on the front end. The print liquid outlet 785 may be provided closer to the bottom than to the top of the front end 781. The gas inlet 786 may be positioned above the print liquid outlet 785. The front end may also have a print liquid inlet 787 to enable the cartridge to be filled or re-filled with print liquid.

In the example of FIGS. 10A, 10B, and 11, there may be provided a datum surface 793 across the recess from the internal side 789 of the first wall 788. A rib 798 may support the first wall 788. In the example shown, the datum surface is a side of a second wall 794 facing towards the recess 791. The datum surface 793 helps ensure smooth installation and removal of the print liquid supply cartridge to and from a printer.

In some examples, the print liquid supply cartridge 1000 may include a conductor or conductors that are situated through a joint of the print liquid supply cartridge 1000. For example, a first conductor may be a serial data line and/or a second conductor may be a clock line. In some examples, a third conductor may be a power line and/or a fourth conductor may be a ground line. In some examples, the conductor or conductors may be coupled to the electrical connection pad or pads 792. The electrical connection pad(s) 792 may be situated in the recess 791.

In some examples, the electrical connection pad(s) 792 and the conductor(s) may be supported by a housing component. For example, the electrical connection pad(s) and the conductor(s) may be supported by the first housing component 102 (e.g., lid) described herein. For instance, the electrical connection pad(s) and the conductor(s) may be supported by the first wall 788, which may be a first wall 788 of a first housing component. In some examples, the print liquid supply cartridge 1000 includes a sensor or sensors. In some examples, the sensor(s) may be supported by the first housing component and/or the first wall 788.

In some examples, the print liquid supply cartridge 1000 may include a print liquid interface or interfaces. A print liquid interface is an interface for the passage of print liquid. Examples of a print liquid interface may include the print liquid outlet 785 and the print liquid inlet 787, which may be included in the front end 781 of the print liquid supply cartridge.

The invention claimed is:

1. A print liquid supply unit, comprising:
 a first housing component that is welded to a second housing component along a supply joint;
 a first conductor situated through the supply joint from an outside of the supply unit to an inside of the supply unit, wherein the first conductor is sealed in the supply joint with a sealing material; and
 a second conductor situated through the supply joint, wherein the first conductor is a serial data line and the second conductor is a clock line.

2. The print liquid supply unit of claim 1, further comprising a third conductor and a fourth conductor situated through the supply joint, wherein the third conductor is a power line and the fourth conductor is a ground line.

3. The print liquid supply unit of claim 1, wherein the sealing material comprises transmissive plastic or elastomeric material.

4. The print liquid supply unit of claim 1, wherein the sealing material comprises a slot.

5. The print liquid supply unit of claim 4, wherein joint material is situated in the slot.

6. The print liquid supply unit of claim 4, wherein the slot is situated in a weld path of the supply joint.

7. The print liquid supply unit of claim 4, wherein the slot is located in the sealing material between the first conductor and a second conductor.

8. The print liquid supply unit of claim 4, wherein the slot is located at an edge of the sealing material.

9. The print liquid supply unit of claim 1, wherein the supply joint is welded with a laser that passes through the sealing material.

10. The print liquid supply unit of claim 1, wherein the sealing material has a first melting temperature that is greater than a second melting temperature of joint material.

11. The print liquid supply unit of claim 1, wherein welding is performed with an ultrasonic weld or with a laser weld that is not applied along a portion of the supply joint with the sealing material.

12. The print liquid supply unit of claim 1, wherein the sealing material is non-transmissive sealing material.

13. The print liquid supply unit of claim 1, further comprising a print liquid outlet and a gas inlet on a front end of the print liquid supply unit.

14. The print liquid supply unit of claim 1, wherein the first conductor is coupled to a sensor inside of the print liquid supply unit and to an electrical connection pad on the outside of the print liquid supply unit.

15. The print liquid supply unit of claim 14, further comprising a front end with at least one print liquid interface, a bottom, and a top, wherein the print liquid supply unit comprises a recess in and between the front end and the top, wherein the electrical connection pad is situated in the recess.

16. The print liquid supply unit of claim 15, wherein the electrical connection pad and the first conductor are supported by the first housing component.

17. The print liquid supply unit of claim 15, wherein the electrical connection pad and the first conductor are supported by a same wall of the first housing component.

18. The print liquid supply unit of claim 16, comprising at least one sensor connected to the first conductor, wherein the at least one sensor is supported by the same wall or the first housing component.

19. A print liquid container, comprising:
 a container property sensor including at least one of a digital liquid level sensor, temperature sensor, strain sensor, or pressure sensor connected to a container wall;
 a first conductor coupled to the container property sensor that passes through a slot in the container wall, wherein the slot is distanced from a joint of container shells; and
 a second conductor, wherein the first conductor is a serial data line and the second conductor is a clock line.

20. The print liquid container of claim 19, wherein the container property sensor includes the digital liquid level sensor.

21. The print liquid container of claim 19, wherein a carrier supporting the container property sensor is sealed to the container wall.

* * * * *